(12) United States Patent
Balakrishnan et al.

(10) Patent No.: US 7,305,028 B2
(45) Date of Patent: Dec. 4, 2007

(54) METHODS AND SYSTEM FOR EQUALIZING DATA

(75) Inventors: Jaiganesh Balakrishnan, Dallas, TX (US); Richard K. Martin, Ithaca, NY (US); C. Richard Johnson, Jr., Newfield, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 754 days.

(21) Appl. No.: 10/390,289

(22) Filed: Mar. 17, 2003

(65) Prior Publication Data

US 2003/0210742 A1 Nov. 13, 2003

Related U.S. Application Data

(60) Provisional application No. 60/365,302, filed on Mar. 18, 2002.

(51) Int. Cl.
*H03K 5/159* (2006.01)
*H04B 1/10* (2006.01)

(52) U.S. Cl. .................................. 375/232; 375/346
(58) Field of Classification Search ................ 375/229, 375/230, 232, 316, 346
See application file for complete search history.

(56) References Cited

U.S. PATENT DOCUMENTS

| | | | |
|---|---|---|---|
| 5,285,474 A | 2/1994 | Chow et al. | 375/13 |
| 5,650,954 A | 7/1997 | Minuhin | 364/825 |
| 5,673,290 A | 9/1997 | Cioffi | 375/260 |
| 6,320,902 B1 | 11/2001 | Nafie et al. | 375/228 |
| 6,370,190 B1 | 4/2002 | Young et al. | 375/233 |
| 6,829,296 B1 * | 12/2004 | Troulis et al. | 375/232 |
| 7,027,536 B1 * | 4/2006 | Al-Dhahir | 375/347 |
| 2001/0043651 A1 * | 11/2001 | Nishimura et al. | 375/232 |
| 2004/0068332 A1 * | 4/2004 | Ben-Gal et al. | 700/51 |

OTHER PUBLICATIONS

M. de Courville, P. Duhamel, P. Madec, and J. Palicot, "Blind equalization of OFDM systems based on the minimization of a quadratic criterion," in *Proceedings of the Int. Conf. on Communications*, Dallas, TX, Jun. 1996, pp. 1318-1321.

(Continued)

*Primary Examiner*—David B. Lugo
(74) *Attorney, Agent, or Firm*—Burns & Levinson LLP; Jacob N. Erlich; Orlando Lopez

(57) ABSTRACT

A method for equalizing data and systems utilizing the method. The method of this invention for equalizing (by shortening the channel response) data includes minimizing a function of the data and a number of equalizer characteristic parameters, where the function utilizes auto-correlation data corresponding to equalized data. Updated equalizer characteristic parameters are then obtained from the minimization and an initial set of equalizer characteristic parameters. Finally, the received data is processed utilizing the equalizer defined by the minimization. The method of this invention can be implemented in an equalizer and the equalizer of this invention may be included in a system for receiving data.

16 Claims, 5 Drawing Sheets

OTHER PUBLICATIONS

J. Balakrishnan, R. K. Martin, and C. R. Johnson, Jr., "Blind, Adaptive Channel Shortening by Sum-squared Auto-correlation Minimization (SAM)," in *Proc. Asilomar Conf. on Signals, Systems, and Computers*, Pacific Grove, CA, Nov. 2002.

John R. Treichler, Michael G. Larimore and Jeffrey C. Harp, "Practical Blind Demodulators for Higher Order QAM Signals", Proc. IEEE, vol. 86, No. 10 (Oct. 1998)1907-1926.

K. Sistanizadeh, "*Loss characteristics of the proposed canonical ADSL loops with 100-Ohm termination at 70, 90, and 120 F*," ANSI T1E1.4 Committee Contribution, No. 161, Nov. 1991. The channel data is available at http://www.ece.utexas.edu/~bevans/projects/adsl/dmtteq/dmtteq.html.

U.S. Appl. No. 60/365,302, filed Mar. 18, 2002. Title: Blind, Adaptive Channel Shortening by Sum-squared Auto-correlation Minimization. Applicants: Jaiganesh Balakrishnan, et al.

* cited by examiner

METHODS AND SYSTEM FOR EQUALIZING DATA

CROSS REFERENCE TO RELATED APPLICATIONS

This application claims priority of U.S. Provisional Application 60/365,302, "Blind, Adaptive Channel Shortening by Sum-squared Auto-correlation Minimization", filed on Mar. 18, 2002, which is incorporated by reference herein.

STATEMENT REGARDING FEDERALLY SPONSORED RESEARCH OR DEVELOPMENT

This invention was made partially with U.S. Government support from the National Science Foundation under Contract No. ECS-9811297. The U.S. Government has certain rights in the invention.

BACKGROUND OF THE INVENTION

This invention relates generally to data communications and, more particularly, to methods and systems for time domain equalization of data signals received from a data communications channel and for channel shortening.

Channel shortening can be thought of as a generalization of equalization, since equalization amounts to shortening the channel to length 1. Channel shortening was first utilized in an optimal estimation method that minimizes the error probability of a sequence, maximum likelihood sequence estimation (MLSE).

A form of channel shortening can also be utilized in multiuser detection. For a flat-fading DS-CDMA system with L users, the optimum multiuser detector is the MLSE detector; yet, complexity grows exponentially with the number of users. "Channel shortening" can be implemented to suppress L-K of the scalar channels and retain the other K channels, effectively reducing the number of users from L to K.

Channel shortening has recently seen a revival due to its use in multicarrier modulation (MCM). MCM techniques such as orthogonal frequency division multiplexing (OFDM) and discrete multi-tone (DMT) have been deployed in applications ranging from the wireless LAN standards IEEE 802.11a and HIPERLAN/2, Digital Audio Broadcast (DAB) and Digital Video Broadcast (DVB) in Europe, to asymmetric and very-high-speed digital subscriber loops (ADSL, VDSL).

In one example of a multicarrier system, before transmission, the available bandwidth is divided into parallel sub-bands(tones). The incoming data is distributed among all the available tones and used to modulate each tone. An Inverse Fast Fourier Transform operation converts the modulated tones into a time domain signal. Before entering the transmission channel, a cyclic prefix is added to the time sequence.

One reason for the popularity of MCM is the ease with which MCM can combat channel dispersion, provided the channel delay spread is not greater than the length of the cyclic prefix (CP). However, if the CP is not long enough, the orthogonality of the sub-carriers is lost and this causes both inter-carrier interference (ICI) and inter-symbol interference (ISI).

A technique for ameliorating the impact of an inadequate CP length is the use of a time-domain equalizer (TEQ) in the receiver. The TEQ is a filter that shortens the effective channel (by shortening the channel impulse response) to the length of the CP plus one.

Since transmission channels and noise statistics can change during operation, it is desirable to design an equalizer that changes when the receiver or received data changes. Such an equalizer is described as an adaptive equalizer. An adaptive equalizer design method is given in U.S. Pat. No. 5,285,474 (issued on Feb. 4, 1994 to J. Chow et al.). However, the algorithm of U.S. Pat. No. 5,285,474 requires training data. Similarly, the time domain equalizer described in U.S. Pat. No. 6,320,902 (issued on Nov. 20, 2001 to M. Nafie et al.) also requires training data.

It is also desirable to design an adaptive equalizer that does not require training data or identification of the channel. Such equalizers are described as blind adaptive equalizers. De Courville, et al. have proposed a blind, adaptive TEQ (M. de Courville, P. Duhamel, P. Madec, and J. Palicot, "Blind equalization of OFDM systems based on the minimization of a quadratic criterion," in *Proceedings of the Int. Conf. on Communications*, Dallas, Tex., June 1996, pp. 1318-1321.) that relies on the presence of unused subcarriers within the transmission bandwidth. However, the method described by de Courville performs complete equalization rather than channel shortening. Since it is desired to perform channel shortening, the overall performance of an equalizer that performs complete equalization is expected to be worse.

There is a need for a blind adaptive equalizer designed for channel shortening.

It is therefore an object of this invention to provide methods for the design of a blind adaptive equalizer for channel shortening.

It is a further object of this invention to provide a blind adaptive equalizer for channel shortening.

SUMMARY OF THE INVENTION

The objects set forth above as well as further and other objects and advantages of the present invention are achieved by the embodiments of the invention described hereinbelow.

A method for obtaining and updating the coefficients of blind, adaptive channel shortening time domain equalizer for application in a data transmission system is disclosed.

The method of this invention for equalizing (by shortening the channel response) data includes minimizing a function of the data and a number of equalizer characteristic parameters, where the function utilizes auto-correlation data corresponding to equalized data. The equalizer characteristic parameters are then obtained from the minimization and an initial set of equalizer characteristic parameters. Finally, the data is processed utilizing the equalizer defined by the minimization.

The method of this invention can be implemented in an equalizer and the equalizer of this invention may be included in a system for receiving data from a transmission channel.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

A method for obtaining and updating the coefficients of blind, adaptive channel shortening time domain equalizer for application in a data transmission system and equalizers obtained by that method are disclosed hereinbelow.

Figure 1:
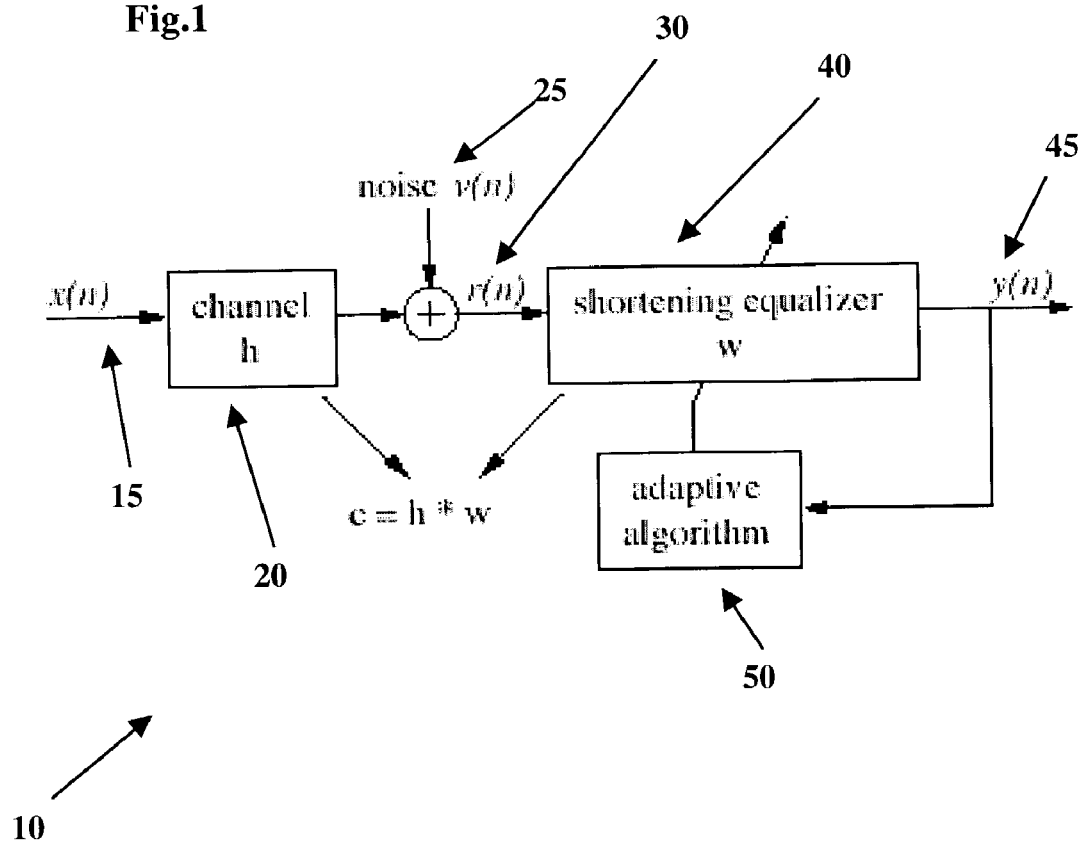
FIG. 1 is a graphical and block representation of an embodiment of a receiving section of a data transmission system utilizing an equalizer of this invention.

FIG. 1 depicts a block representation of an embodiment of a receiving section 10 of a data transmission system including an equalizer 40 of this invention. Referring to FIG. 1, the received sequence r(n) 30 is generated by passing the transmitted data x(n) 15 through a channel h 20 and adding samples of the noise v(n) 25. The impulse response of the channel 20 is represented by a sequence $h(0), h(1) \ldots h(L_h)$ of length $L_h+1$ (length as used herein refers to the number of samples in the sequence; if the samples are taken at preselected time intervals, the length would correspond to the duration of the response). The impulse response of the equalizer 40 is represented by a sequence $w(0), w(1) \ldots w(L_w)$ of length $L_w+1$. The received sequence r(n) 30 is given by the following expression, $$r(n) = \sum_{k=0}^{L_h} h(k)x(n-k) + v(n)$$

The output sequence y(n) 45 is given by $$y(n) = \sum_{k=0}^{L_w} w(k)r(n-k)$$

or, in vector notation $$y(n) = w^T r_n$$

where $w^T$ is the transposed vector $[w(0) w(1) \ldots w(L_w)]$ and $r_n$ is the vector $[r(n) r(n-1) \ldots r(n-L_w)]^T$. In the absence of noise, the system impulse response, c, is given by the convolution of the channel impulse response, h, and the equalizer impulse response, w, $$c(n) = h(n) * w(n) = \sum_{k=0}^{L_w} w(k)h(n-k)$$

where c is of length $L_h+L_w+1$.

In order to "shorten" the channel 20 to a length v+1, it is desirable to obtain a system response that is zero outside of a window of length v+1. (This condition, however, can not be achieved with a finite length equalizer.)

Figure 2:
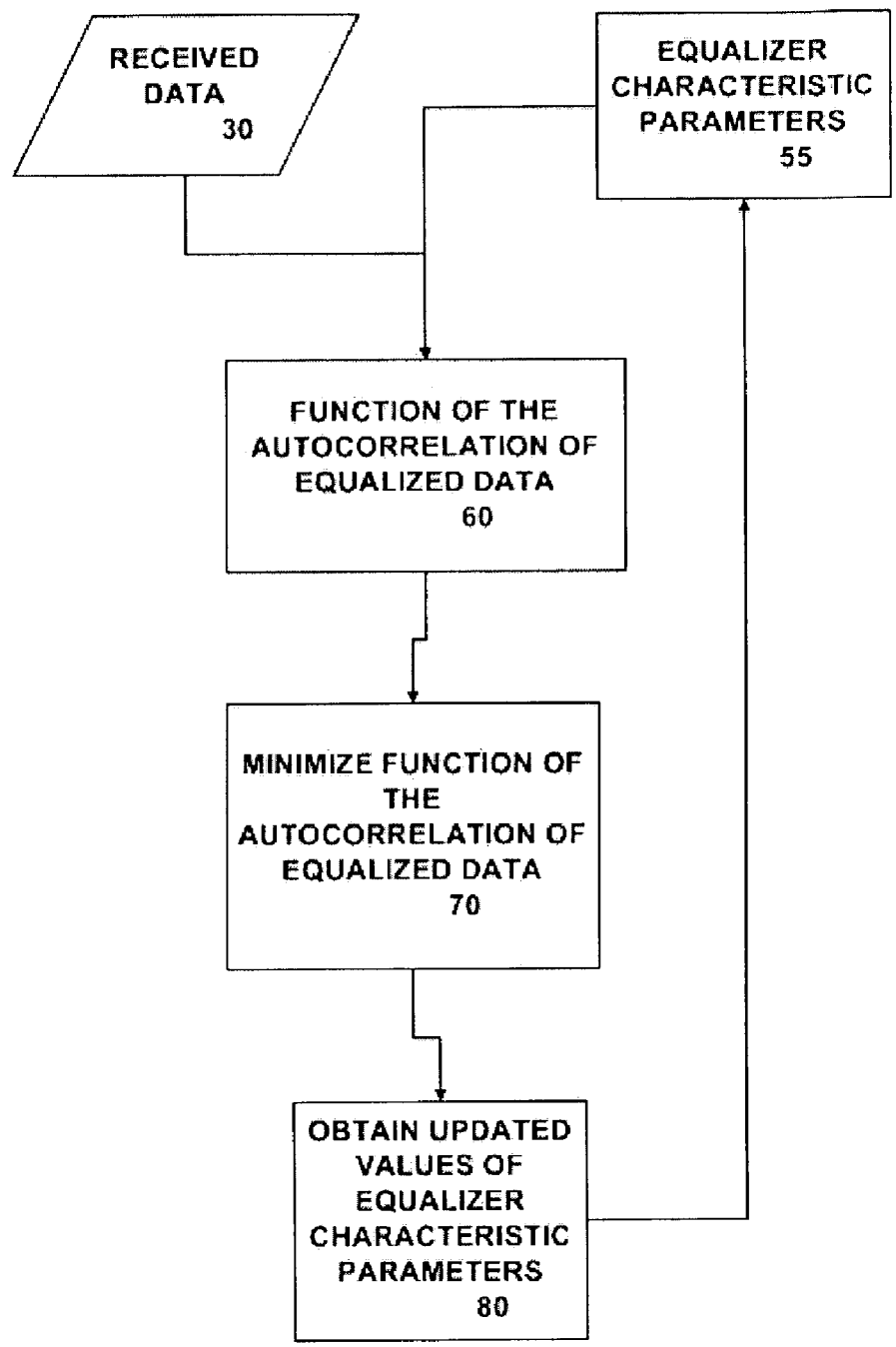
FIG. 2 is a block diagram of an embodiment of the method of this invention.

FIG. 2 is a block diagram of an embodiment of the method of this invention for obtaining values of the equalizer characteristic parameters. In one embodiment, the equalizer characteristic parameters are the values of the equalizer impulse response. For a specific equalizer design, such as a transversal filter equalizer, the equalizer characteristic parameters are the design parameters of That specific equalizer design. Referring to FIG. 2, a function of the autocorrelation of the equalized data (step 60, FIG. 2), is obtained in terms of the received data, r(n) (30, FIG. 1), and the equalizer characteristic parameters or the impulse response of the equalizer (40, FIG. 1). (The equalized data is the output sequence y(n) 45, FIG. 1.) The function is minimized (step 70, FIG. 2) and the minimization yields updated values of the equalizer characteristic parameters (step 80, FIG. 2). The initial update of the values of the equalizer characteristic parameters requires initial values for the equalizer characteristic parameters (55, FIG. 2). Subsequent updates update the previously obtained values of the equalizer characteristic parameters (55, FIG. 2). The received data, r(n) (30, FIG. 1), is processed utilizing the equalizer 40 incorporating the updated values of the equalizer characteristic parameters. The steps 60, 70, 80 of FIG. 2, constitute the adaptive algorithm 50 of FIG. 1.

The function being minimized (step 70, FIG. 2) is a function of the auto-correlation of the equalized data. Details of an embodiment of the function of the auto-correlation of the equalized data are given herein below.

The auto-correlation sequence of the system impulse response, c, is given by $$R_{cc}(l) = \sum_{k=0}^{L_c} c(k)c(k-l)$$

where $L_c$ is the length of the system impulse response, given by $L_h+L_w+1$. For the system impulse response, c, to be zero outside a window of size v+1, it is necessary for the auto-correlation values $R_{cc}(l)$ to be zero outside of a window of length 2v+1, that is, $$R_{cc}(l)=0 \text{ for } \forall |l|>v$$

The above equation has a trivial solution when c=0 or equivalently w=0. This trivial solution can be avoided by imposing a norm constraint on the system response, for instance $\|c\|_2^2=1$ or equivalently $R_{cc}=0$.

It should be noted that perfect nulling of the auto-correlation values outside the window of interest is not possible, since perfect channel shortening is not possible when a finite length baud-spaced time domain equalizer is used. This is because if the channel impulse response in the frequency domain (or z domain) has $L_h$ zeros, then the system impulse response in the frequency domain will always have $L_w+L_h$ zeros. If we had decreased the length of the system to, for example, $L_s<L_h$ taps, then the combined response would only have $L_s$ zeros, which contradicts the previously stated condition.

Therefore, a cost function is defined in an attempt to minimize (instead of nulling) the sum-squared auto-correlation terms, $$J_{v+1} = \sum_{l=v+1}^{L_c} |R_{cc}(l)|^2$$

The time domain equalizer optimization problem can then be stated as obtaining the sequence $w(0), w(1) \ldots w(L_w)$ of length $L_w+1$ that minimizes $J_{v+1}$ subject to the constraint $\|c\|_2^2=1$.

The auto-correlation function of the sequence y(n) is given by $$R_{yy} = E[y(n)y(n-l)] \approx R_{cc} + \sigma_v^2 \sum_{k=0}^{L_w} w(k)w(k-l),$$

where $\sigma_v^2$ is the variance of the noise sequence v(n) 25 and the second expression is exact when the noise v(n) and the length of the system $L_w+L_h$ satisfy some non-stringent conditions usually satisfied by practical systems (see U.S. Provisional Application 60/365,286, "Blind, Adaptive Channel Shortening by Sum-squared Auto-correlation Minimization", filed on Mar. 18, 2002, and J. Balakrishnan, R. K. Martin, and C. R. Johnson, Jr., "Blind, Adaptive Channel Shortening by Sum-squared Auto-correlation Minimization (SAM)," in *Proc. Asilomar Conf. on Signals, Systems, and Computers*, Pacific Grove, Calif., November 2002), which is also incorporated by reference herein.

In the absence of noise, the auto-correlation function of the output sequence y(n) 45 is equal to the auto-correlation sequence of the system impulse response, c. The cost function $J_{v+1}$ can be defined as $$J_{v+1} = \sum_{l=v+1}^{L_c} |R_{yy}(l)|^2$$

The cost function $J_{v+1}$ depends only on the output sequence y(n) 45 of the time domain equalizer and the choice of v. A gradient-descent algorithm over this cost function, with an additional norm constraint on c or w, requires no knowledge of the source sequence (therefore, it is a blind algorithm).

It should be noted that the channel length $L_h+1$ must be known in order to determine $L_c$. In the embodiment in which the data communications channel is an ADSL system, the channel is typically modeled as a length N FIR filter, where N=512 is the FFT size. For other embodiments, a reasonable estimate (or overestimate) for the channel length $L_h+1$ may be selected based on typical delay spread measurements for that embodiment.

The steepest gradient-descent algorithm over the hyper-surface defined by the cost function $J_{v+1}$ is $$w^{new} = w^{old} - \mu \nabla_w \left( \sum_{l=v+1}^{L_c} |E[y(n)y(n-l)]|^2 \right)$$

where $\mu$ denotes the step size and $\nabla_w$ denotes the gradient with respect to w.

In one implementation of the algorithm, the expectation operation in the steepest gradient-descent algorithm is replaced by a moving average over a user-defined window of length N. The algorithm, in the moving average implementation, is given by $$w^{k+1} = w^k - 2\mu \sum_{l=v+1}^{L_c} \left[ \left\{ \sum_{n=kN}^{(k+1)N-1} \frac{y(n)y(n-l)}{N} \right\} \left\{ \sum_{n=kN}^{(k+1)N-1} \left( \frac{y(n)r_{n-l} + y(n-l)r_n}{N} \right) \right\} \right]$$

The value of N is a design parameter. It should be large enough to give a reliable estimate of the expectation, but no larger, as the algorithm complexity is proportional to N.

In another implementation of the algorithm, the expectation operation in the steepest gradient-descent algorithm is replaced by an auto-regressive (AR) estimate. (An auto-regressive (AR) estimate is given by $E[y(n)y(n-l)] \approx (1-\alpha)(\text{previous estimate}) + \alpha y(n)y(n-l)$.)

The algorithm, in the auto-regressive implementation, is given by $$w^{n+1} = w^n - 2\mu \sum_{l=v+1}^{L_c} \{E[y(n)y(n-1)]\}\{E[y(n)r_{n-l} + y(n-l)r_n]\}$$

The above expression can be expressed as by $$w^{n+1} \cong w^n - 2\mu\{B_{l-v}\}\left\{\begin{bmatrix} A_{l-v} \\ \vdots \\ A_{l-v+L_w} \end{bmatrix} + \begin{bmatrix} C_{1,l-v} \\ \vdots \\ C_{L_w+1,l-v} \end{bmatrix}\right\} \text{ where}$$

$$A^n = (1-\alpha)A^{n-1} + \alpha y(n) \begin{bmatrix} r(n-v-1) \\ \vdots \\ r(n-L_c-L_w) \end{bmatrix}$$

$$B^n = WA^n$$

$$C^n = (1-\alpha)C^{n-1} + \alpha \begin{bmatrix} r(n) \\ \vdots \\ r(n-L_w) \end{bmatrix} \begin{bmatrix} y(n-v-1) \\ \vdots \\ y(n-L_c) \end{bmatrix}^T, \text{ and,}$$

$$W = \begin{bmatrix} w_0 & w_1 & w_2 & \ldots & 0 & 0 \\ 0 & w_0 & w_1 & \ldots & 0 & 0 \\ \vdots & \vdots & \vdots & \ddots & \vdots & \vdots \\ 0 & 0 & 0 & \ldots & w_{L_w-1} & w_{L_w} \end{bmatrix}, \text{ and}$$

W is the $(L_c-v)\times(L_c+L_w-v)$ convolution matrix of the equalizer and $0<\alpha<1$ is a design parameter. The choice of $\alpha$ in the auto-regressive implementation is analogous to the choice of N in the moving average implementation.

With both implementations, w must be periodically renormalized to enforce the constraint $\|c\|_2^2=1$ (the unit norm constraint). (The constraint may also be implemented by adding a penalty term onto the cost function.) In many applications of interest, the source sequence x(n) 15 can be considered to be "white" (in the noise sense). Under those conditions $E[y^2(n)] = \|c\|_2^2 + \sigma_v^2 \|w\|_2^2 \approx \|c\|_2^2$ and the norm of c can be determined by monitoring the energy of the output sequence y(n) 45. Another implementation of the unit norm constraint is obtained by normalizing the equalizer response w, requiring that $$\|w\|_2^2 = 1.$$

The above implementation of the unit norm constraint is used in the simulations described herein below. (Although an $L_2$ norm is used throughout herein, it should be noted that other norms could be used.)

The time domain equalizer of this invention may be utilized, for example, but not limited to, in multi-carrier modulation systems, such as ADSL systems, in block based data communication systems, and also in non-CP based (non-cyclic prefix based) systems.

Figure 3:
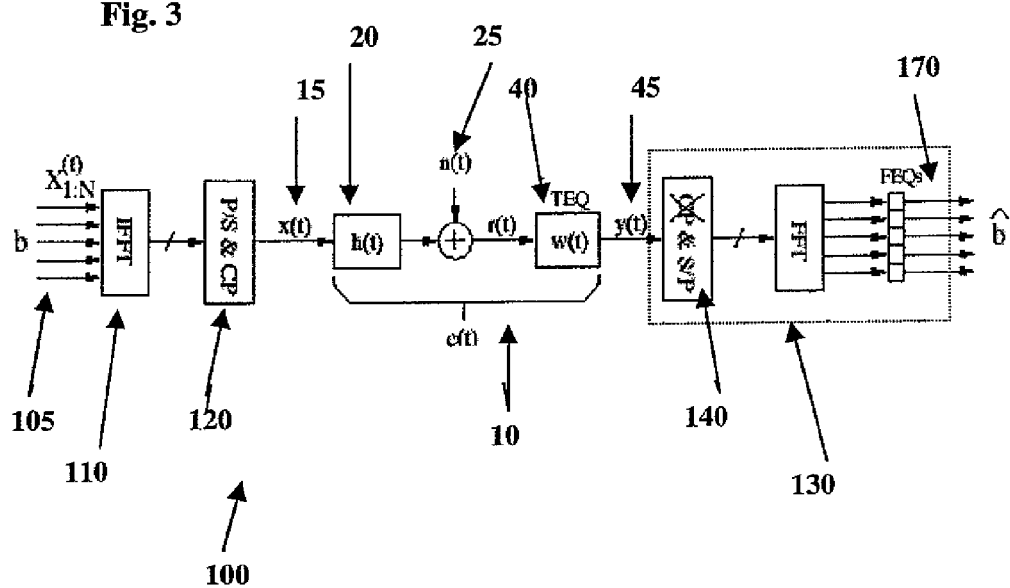
FIG. 3 is a graphical and block representation of an embodiment of a data transmission system utilizing an equalizer of this invention.

FIG. 3 depicts a graphical and block representation of an embodiment of a multi-carrier data transmission system utilizing an equalizer of this invention.

Referring to FIG. 3, in a multi-carrier modulation system 100, input data 105 is Inverse Fast Fourier Transformed (IFFT) by an IFFT component 110 and converted from parallel to serial and a cyclic prefix (CP) added 120. The transmitted data x(t) 15 is transmitted through the channel h 20 and the noise v(t) 25 added. The transmitted data and the added noise, r(t) 30, constitutes the input to the receiver 170. The receiver 170 includes an equalizer 40 of this invention and a demodulator 130. The equalizer 40 is described by a number of equalizer characteristic parameters. An initial value for the equalizer characteristic parameters is provided. In one embodiment, the initialization is a single spike. An updated value for each one of the equalizer characteristic parameters is obtained by minimizing a function of the auto-correlation data of the equalized data, y(t) 45, applying one of the embodiments detailed above. The demodulator 130 includes a module 140 that receives the equalized data, y(t) 45, removes the cyclic prefix and converts the received data from serial to parallel, a Fast Fourier Transform (FFT) module that converts the time domain signal back to modulated tones. The modulated tones are equalized by a frequency-domain equalizer (FEQ), a bank of complex scalars. It should be noted that although the embodiment shown in FIG. 3 depicts an ADSL compatible system, such as that described in U.S. Pat. No. 5,673,290 (issued to Cioffi on Sept. 30, 1997), other embodiments are also within the scope of this invention. For example, the equalizer of this invention could also be utilized, but is not limited to, in the embodiments described by John R. Treichier, Michael G. Larimore and Jeffrey C. Harp in "Practical Blind Demodulators for Higher Order QAM Signals', Proc. IEEE, Vol. 86, No. 10 (Oct. 1998)1907-1926.

The equalizer can be implemented in software, hardware or a combination of software and hardware. If implemented in software (or partially implemented in software), the receiver 170 may include one or more processors (not shown) and one or more computer readable memories (also not shown) containing instructions capable of causing the one or more processors to execute the method of this invention (described herein above).

Figure 4:
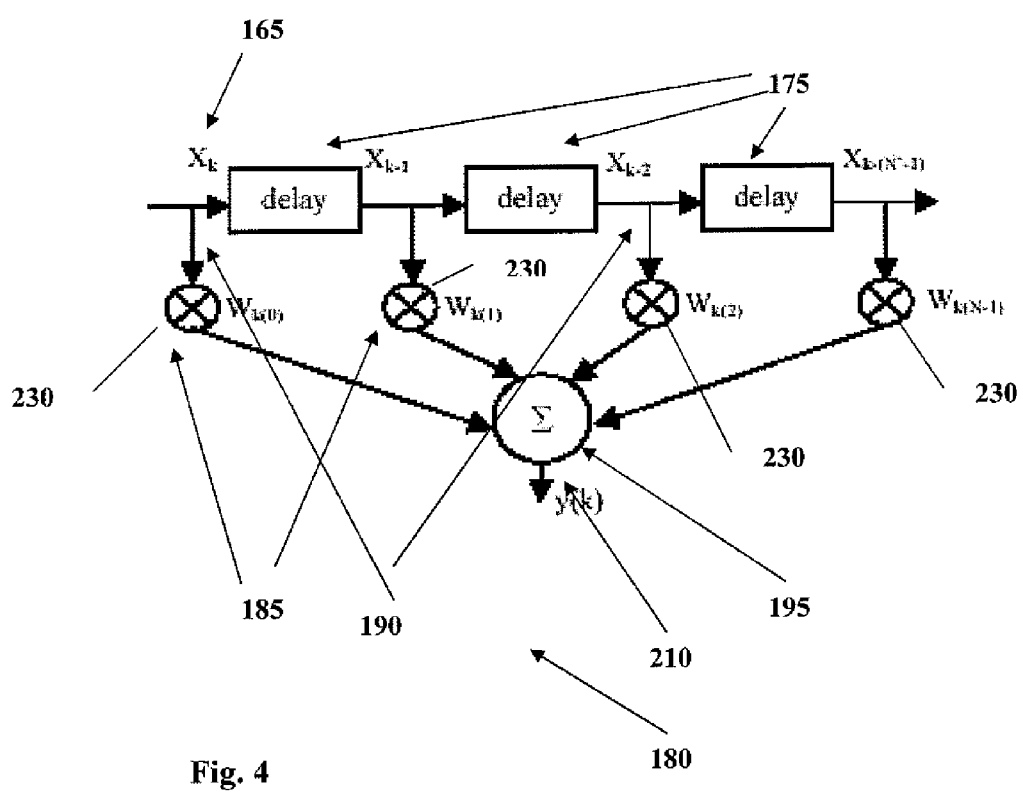
FIG. 4 is a graphical and block representation of an embodiment of an equalizer of this invention.

FIG. 4 depicts a block representation of an embodiment of an equalizer of this invention. Referring to FIG. 4, a transversal filter 180 implementation of the equalizer 40 of this invention includes a number of delay elements 175, a number of multiplying elements 185, and a summing element 195. During operation, each delay element 175 delays a datum from the received data x(k) 165, denoted by $x_k$, by a predetermined delay, which in the embodiment shown in FIG. 4 is one unit. The output 190 of each delay element is multiplied by a weight value $w_{k(0)}, w_{k(1)}, w_{k(2)}, \ldots, w_{k(N-1)}$. The weight values are initially set to an initial value $w_{0(0)}, w_{0(1)}, w_{0(2)}, \ldots, w_{0(N-1)}$. In one embodiment, the initial values are 0,0,0, . . . 1, . . . , 0,0,0, where the non-zero ("1") value occurs at the mid-point of the weight value sequence.

The weight values are updated according to the method of this invention. The transversal filter 180 implementation of the equalizer 40 includes means (not shown) for providing the updated weight values to the multipliers. If the equalizer is implemented in software (also referred to as computer readable code) such means are locations in a computer readable memory in which each weight value is stored and instructions for retrieving each updated weight value and providing to a multiplier unit. If the equalizer is implemented in hardware, such means can have various embodiments (see, for example, but not limited to, U.S. Pat. No. 6,370,190, issued on Apr. 9, 2002 to Young et al., and U.S. Pat. No. 5,650,954, issued on Jul. 22, 1997 to Minuhin, both of which are incorporated by reference herein).

For the embodiment of the function of the auto-correlation of the equalized data given herein above, the weight values are updated according to $$w^{new} = w^{old} - \mu \nabla_w \left( \sum_{i=v+1}^{L_r} E|y(n)y(n-1)|^2 \right)$$

The multiplier outputs 205 are added by the summing element 195 to produce the filter output 210

$$y(k) = \sum_{l=0}^{N} w_{k(l)} x_{k-l}$$

or, in vector notation $$y(k) = w_k^T x(k).$$

In order to even more clearly understand the methods of this invention, reference is now made to the following illustrative simulation example. The data communications channel utilized in the example below is an ADSL channel as in FIG. 3. The cyclic prefix v used was 32; the FFT size was 512; the time domain equalizer had 16 taps; the channel was the CSA test loop 1 (see K. Sistanizadeh, "Loss characteristics of the proposed canonical ADSL loops with 100-Ohm termination at 70, 90, and 120 F," ANSI T1E1.4 Committee Contribution, no. 161, Nov. 1991.). The channel data is available at www.ece.utexas.edu/~bevans/projects/ads1/dmtteq/dmtteq. html.

The noise power was set such that the power of the signal transmitted through the channel is 40 db above the noise power.

The auto-regressive implementation of the method of this invention was used in the example below. The value of α in the auto-regressive implementation was set at α=1/100 and the unit norm equalizer constraint, $\|w\|_2^2 = 1$, was utilized. The time domain equalizer was initialized to a single spike; that is, the initial tap values of the 16 tap equalizer are [0, 0, 0, 0, 0, 0, 0, 1, 0, 0, 0, 0, 0, 0, 0, 0].

Figure 5A:
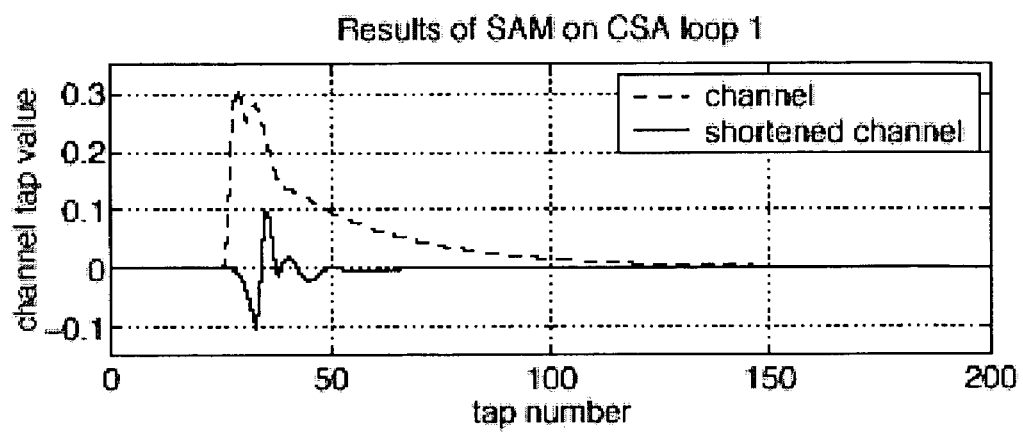
FIG. 5a is a graphical representation of results from applying one embodiment of the equalizer of this invention; and, FIG. 5b is a graphical representation of an equalizer of this invention.
Figure 5B:
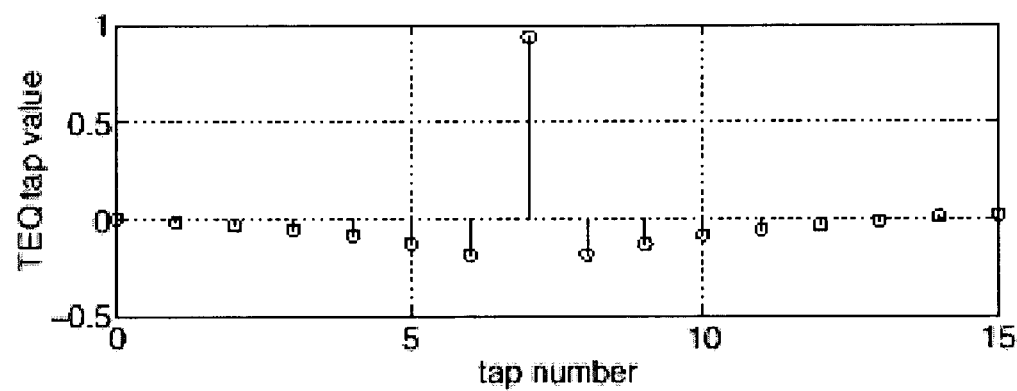

FIG. 5a shows the channel impulse response and the combined channel-equalizer impulse response for an equalizer obtained from the method of this invention. FIG. 5b shows an equalizer obtained from the method of this invention. Referring to FIGS. 5b and 4, a graphical representation of the equalizer is shown, where a weight value 230, corresponding to $W_{k(i)}$ of FIG. 4, is given for the $i^{th}$ delay 175.

It should be noted that, although the example given refers to ADSL, the method and systems of this invention can be applied to a broad range of data communication channels. For example, this invention may be utilized, but not limited to, in multi-carrier modulation systems, such as ADSL systems, in block based data communication systems, and also in non-CP based (non-cyclic prefix based) systems. Applications where channel shortening can ameliorate the effects of inter-symbol interference could benefit from the method and systems of this invention.

It should also be noted that although the embodiment disclosed herein above was obtained by minimizing a function of the auto-correlation data subject to the constraint $\|w\|=1$, other constraints are can be utilized to arrive at other embodiments. Some possible constraints include, but not limited to, A) $\|c\|=1$,
B) $w_l=1$ for some $l \in [0, \ldots, L_w]$,
C) $\|[c_\Delta, \ldots, c_{\Delta+\nu}]^T\|=1$.

It should be noted that although the equalizer representation embodiment shown is a transversal filter equalizer other embodiments are within the scope of this invention.

Although the invention has been described with respect to various embodiments, it should be realized this invention is also capable of a wide variety of further and other embodiments within the spirit and scope of the appended claims.

What is claimed is:

1. A method for equalizing received data, the method comprising the steps of:
   utilizing auto-correlation data limited substantially to data corresponding to equalized data to define a function of the data and a plurality of equalizer characteristic parameters;
   minimizing the function;
   obtaining from said minimization and from a plurality of initial values, an updated value for each one of said plurality of equalizer characteristic parameters; and,
   processing the received data utilizing said plurality of equalizer characteristic parameters in order to provide equalization.

2. The method of claim 1 wherein the step of minimizing said function comprises the step of:
   minimizing said function subject to a constraint.

3. The method of claim 2 wherein the step of minimizing said function comprises the step of:
   minimizing a sum of a magnitude squared of each datum from said auto-correlation data.

4. The method of claim 3 wherein the step of minimizing said function further comprises the step of:
   applying a moving average operation in obtaining said auto-correlation data.

5. The method of claim 3 wherein the step of minimizing said function further comprises the step of:
   applying auto-regressive estimation in obtaining said auto-correlation data.

6. A receiver comprising:
   an equalizer capable of receiving data and processing the data in order to generate equalized data, said equalizer including a plurality of equalizer characteristic parameters, an updated value for each one of said plurality of equalizer characteristic parameters being obtained by minimizing a function of the received data and said plurality of equalizer characteristic parameters, said function being defined by auto-correlation data limited substantially to auto-correlation data corresponding to the equalized data; and,
   a demodulator capable of receiving the equalized data from said equalizer.

7. The receiver of claim 6 wherein said function comprises a sum of a magnitude squared of each datum from said auto-correlation data.

8. A receiver comprising:
   an equalizer capable of receiving data and processing the data in order to provide equalized data, said equalizer including a plurality of equalizer characteristic parameters;
   a demodulator capable of receiving the equalized data from said equalizer;
   at least one processor;
   at least one computer readable medium, having computer readable code embodied therein, said code capable of causing the at least one processor to:
      minimize a function of the received data and said plurality of equalizer characteristic parameters, said function utilizing auto-correlation data limited substantially to auto-correlation data corresponding to the equalized data;
      obtain from said minimization and from a plurality of initial values an updated value for each one of said plurality of equalizer characteristic parameters; and,
      provide said updated value for each one of said plurality of equalizer characteristic parameters to said equalizer.

9. The receiver of claim 8 wherein said code in causing the at least one processor to minimize said function further causes the at least one processor to:
   minimize said function subject to a constraint.

10. The receiver of claim 9 wherein said function comprises a sum of a magnitude squared of each datum from said auto-correlation data.

11. The receiver of claim 10 wherein said code is further capable of causing the at least one processor to:
   apply a moving average operation in obtaining said auto-correlation data.

12. The receiver of claim 10 wherein said code is further capable of causing the at least one processor to:
   apply auto-regressive estimation in obtaining said auto-correlation.

13. An equalizer comprising:
   a plurality of equalizer characteristic parameters;
   an updated value for each one of said plurality of equalizer characteristic parameters being obtained from an initial value from a plurality of initial values by minimization of a function of equalizer input data and said plurality of equalizer characteristic parameters; said function being defined by auto-correlation data limited substantially to auto-correlation data corresponding to equalizer output data.

14. The equalizer of claim 13 further comprising:
   a plurality of delay elements, each one delay element from said plurality of delay elements delaying a datum from the equalizer input data by a predetermined delay;
   a plurality of multiplying elements, each one multiplying element from said plurality of multiplying elements multiplying an output of one delay element from said plurality of delay elements by one weight value from a plurality of weight values;
   a summing element capable of receiving an output from each said multiplying element from said plurality of multiplying elements; and, wherein said plurality of equalizer characteristic parameters includes said plurality of weight values.

15. The equalizer of claim 14 further comprising:
   means for providing one updated weight value from said plurality of weight values to each one multiplying element from said plurality of multiplying elements.

16. The equalizer of claim 13 wherein the step of minimizing said function comprises the step of:
   minimizing a sum of a magnitude squared of each auto-correlation datum from said auto-correlation data.

* * * * *